(12) United States Patent
Xu et al.

(10) Patent No.: US 11,977,482 B2
(45) Date of Patent: May 7, 2024

(54) HASH FUNCTION WITH PRE-SCRAMBLER

(71) Applicant: FLC Technology Group, Inc., Santa Clara, CA (US)

(72) Inventors: Rong Xu, Mountain View, CA (US); Xiaojue Zeng, Santa Clara, CA (US); Fan Yang, San Jose, CA (US); Hunglin Hsu, Cupertino, CA (US); Sehat Sutardja, Santa Clara, CA (US)

(73) Assignee: FLC Technology Group, Inc., Santa Clara, CA (US)

( * ) Notice: Subject to any disclaimer, the term of this patent is extended or adjusted under 35 U.S.C. 154(b) by 156 days.

(21) Appl. No.: 17/465,237

(22) Filed: Sep. 2, 2021

(65) Prior Publication Data
US 2022/0066929 A1    Mar. 3, 2022

Related U.S. Application Data

(60) Provisional application No. 63/074,090, filed on Sep. 3, 2020.

(51) Int. Cl.
*G06F 12/06*    (2006.01)
*G06F 16/22*    (2019.01)
(Continued)

(52) U.S. Cl.
CPC ...... *G06F 12/0646* (2013.01); *G06F 16/2255* (2019.01); *G06F 16/9014* (2019.01); *G06F 21/6227* (2013.01); *G06F 2212/1016* (2013.01)

(58) Field of Classification Search
CPC ............... G06F 9/30101; G06F 9/3885; G06F 12/0646; G06F 2212/1016; G06F 16/2255; G06F 16/9014; G06F 21/6227
(Continued)

(56) References Cited

U.S. PATENT DOCUMENTS 10,740,466 B1 *   8/2020   Bshara ................ G06F 21/6218
10,901,917 B1 *   1/2021   Volpe .................. G06F 12/1408
(Continued)

FOREIGN PATENT DOCUMENTS

SK    10-2017-0065374    6/2017
SK    10-2017-0122481    11/2017

OTHER PUBLICATIONS

Gunawardena, A. (retrieved 2014). 15-121 Data Structures: Collision Resolution. Original PDF hosted by Carnegie Mellon University. PDF retrieved via the WayBack Machine, <http://web.archive.org/web/20140327063245/http://www.cs.cmu.edu/~ab/15-121N11/lectures/lecture16.pdf> (Year: 2014).*
(Continued)

*Primary Examiner* — Reginald G Bragdon
*Assistant Examiner* — Aaron D Ho
(74) *Attorney, Agent, or Firm* — Weide & Miller, Ltd.

(57) ABSTRACT

To avoid hash table collisions, such as in response to sequential addresses, a hash module is provided that includes a first multiplexer that, responsive to a control signal, outputs received data on one of two or more scramblers. The scramblers are configured to selectively receive the selected data output from the first multiplexer and perform a scrambler operation on the selected data to generate scrambled data. A second multiplexer outputs the scrambled data to a first hash module configured to performs a hash function on the scrambled data to generate a hash value. A second hash module, responsive to a collision occurring in the first hash module, perform a hash function on the scrambled data received from the first hash module. The use of a scrambler reduces collisions in the hash module outputs over time and multiple scramblers may be used to further reduce collisions.

13 Claims, 8 Drawing Sheets

(51) Int. Cl.
*G06F 16/901* (2019.01)
*G06F 21/62* (2013.01)

(58) Field of Classification Search
USPC .......................................... 711/201, 216, 219
See application file for complete search history.

(56) References Cited

U.S. PATENT DOCUMENTS

| | | | |
|---|---|---|---|
| 2003/0072449 A1* | 4/2003 | Myszne | H04L 25/03866 380/265 |
| 2010/0217953 A1* | 8/2010 | Beaman | G06F 16/2255 711/216 |
| 2011/0231565 A1 | 9/2011 | Gelter et al. | |
| 2013/0101111 A1* | 4/2013 | Sharon | H04L 9/34 380/28 |
| 2013/0268770 A1* | 10/2013 | Hunt | G06F 16/2255 713/189 |
| 2013/0275656 A1* | 10/2013 | Talagala | G06F 12/0246 711/103 |
| 2014/0032569 A1* | 1/2014 | Kim | G06F 16/137 707/747 |
| 2015/0227796 A1* | 8/2015 | Holzschneider | G06F 16/5838 382/103 |
| 2018/0024781 A1* | 1/2018 | Pedersen | G06F 12/0246 711/103 |
| 2018/0095985 A1* | 4/2018 | Zhang | G06F 3/0608 |
| 2018/0137061 A1* | 5/2018 | Peeters | G06F 21/72 |
| 2019/0042440 A1 | 2/2019 | Kumar et al. | |
| 2019/0377810 A1* | 12/2019 | Soni | G06F 16/2272 |

OTHER PUBLICATIONS

Munro, J. I., & Celis, P. (Nov. 1986). Techniques for collision resolution in hash tables with open addressing. In Proceedings of 1986 ACM Fall joint computer conference (pp. 601-610). (Year: 1986).*

Nimbe, P., Frimpong, S. O., & Opoku, M. (2014). An efficient strategy for collision resolution in hash tables. International Journal of Computer Applications, 99(10), 35-41. (Year: 2014).*

Sivaraman R., et al., "FPGA based generic RO TRNG architecture for image confusion, Multimedia Tools and Application" 79(19), pp. 13841-13868, https://link.springer.com/article/10.1007/s11042-019-08592, pp. 13842-13843, Feb. 3, 2020.

* cited by examiner

HASH FUNCTION WITH PRE-SCRAMBLER

1. FIELD OF THE INVENTION

The innovation relates to hash functions and in particular to a method and apparatus for avoiding collisions when storing memory addresses.

2. RELATED ART

Computing systems are a common element in everyone's lives. Such systems typically have a memory system that is addressed by memory addresses. As part of any storing and retrieving items in memory, it is essential to efficiently and accurately store and retrieve memory addresses, and the associated data.

In many embodiments, a table is used to store physical memory addresses which correspond to the location of data in memory at a physical address. Of importance is the allocation of addresses into the memory address table. A commonly used operation to allocate memory address table locations is a hash function. A hash function is a function that can be used to map data of arbitrary size to fixed-size values. The values returned by a hash function are called hash values, hash codes, digests, or simply hashes. The values are used to index a fixed-size table called a hash table. Hash functions and their associated hash tables are widely used in hardware and software applications. Ideally, a hash function satisfies two basic properties. First, it should be very fast to compute to thus avoid slowing system operation. Secondly, it should minimize duplication of output values (collisions). Duplication of outputs for an input (collisions) would lead to different physical addresses being placed into the same location of the memory address table. This would lead to a corrupted memory address table and if a collision does a occur, a separate routing may be performed to deal with this unwanted occurrence.

Modulo is a typical hardware friendly hash function that maps an input address to a location in a confined region, such as a memory table. Modulo hashing is defined as linear mapping, wrapping, and periodic, but with large enough and mutually prime divisors, the collision rate of two input addresses can be extremely low.

For example, working with two levels of modulo hashing, assume PA (physical address) is the input address, and the variables N1 and N2 are mutually prime divisors. In other embodiments, a greater or lesser number of levels of hash may be implemented. Then first level hash function is defined as F1=PA mod N1 and the second level function is defined as F2=PA mod N2. F1 and F2 are the hash function outputs and define locations or slots at which the physical address is stored in memory.

For two different physical addresses to collide in the first level hash table, the address distance between these two physical addresses must be multiples of N1, and for a collision to occur in the second level hash table, the address distance between these two physical addresses must be multiples of N2. N1 is typically larger than N2. In this embodiment, the values N1 and N2 correspond to the size of the respective hash table. In one embodiment, N1 of a value that has 256,000,000 table entries. N2 may be the next smallest prime number. Since N1 and N2 are mutually prime, the address distance of two physical addresses must be multiples of N1*N2 for a collision to occur in both levels of hash table. The address distance is the distance between two addresses which may be defined as |PA1-PA2| where PA1 and PA2 are the first and second physical addresses. In this embodiment, each hash module or level has its own hash table. When N1 and N2 is large enough, the possibility of collision will be extremely low. Additionally, if more levels of modulo hashing are utilized, the possibility of a collision across all hash and mapping operations is further reduced.

However, in many computing systems, physical addresses arrive sequentially, which means a group of addresses which are input to the hash function will occupy, when placed in the memory address table (hash table), a contiguous space in the memory address table. When this occurs, the advantage of multi-level modulo can be much less effective. The chance of two clusters of input addresses collide is no longer rare.

In the earlier example, where two input addresses' separation distance is N1, the first hash function will yield a result that would have these two addresses occupy the same table location, in first level hash table, but the assigned location in second level hash table would not overlap or result in a collision. However, if the input addresses arrive as groups of sequential addresses, the linear mapping characteristic of modulo may cause a large part of the two groups of addresses to also overlap with the first group of addresses in the second level hash table.

Data addresses may be sequential due to the manner in which they are written and/or retrieved. For example, addresses for a video or audio file, or frame buffers, are types of physical addresses that may arrive at the hash module sequentially.

FIG. 1 is a diagram of example memory address tables (hash tables) with associated address mapping. The first hash table 104 includes numerous slots 108. A first group of hashed addresses referred to as table entries 112 is present to the first hash table 104. Similarly, a second group 120 of hashed addresses, referred to as table entry group 124, is present to the first hash table 104. As shown, the first group 112 overlaps with the second group 120.

A second hash table 130 is used to store hash function results in the event of a collision between the entries 116 in the first group 112 and entries 124 in the second group 120. However, due to the sequential nature of the addresses, if a third of the traffic has an address distance to the first two groups which is N1, a large portion of it also falls into the overlap and will collide with first two groups, so those overlapped addresses can't be placed into the second hash table even though there are still a lot of empty places in the first hash table 104 and the second hash table 130 hash table.

This is a drawback to the prior art and the disclosure provided below overcomes these drawbacks and provides additional benefits.

SUMMARY

To overcome the drawbacks of the prior art, a hash module is disclosed that comprises a first multiplexer having at least one data input, a control signal input, and two or more outputs, such that the first multiplexer is configured to, responsive to a control signal, output received data on one of the two or more outputs as selected data. Two or more scramblers are configured to selectively receive the selected data output from the first multiplexer and perform a scrambler operation on the selected data to generate scrambled data. A second multiplexer is provided which has a two or more inputs, a control signal input, and at least one output such that the second multiplexer is configured to, responsive to a control signal, output scrambled data on the at least one output. A first hash module is configured to perform a hash function on the scrambled data received from the second multiplexer to generate a hash value. Responsive to a collision occurring in the first hash module, a second hash module is configured to perform a hash function on the scrambled data which is received from the first hash module.

In one embodiment, the hash module is configured to perform a modulo hash function. The scramblers may be selected from the group consisting of bit swapping functions, LFSR (Linear Feedback Shift Register) and function, CASR (Cellular Automata Shift Register) function. In one embodiment, the output of the hash module is an index to a hash table. It is contemplated that the hash module may further include a controller configured to generate the control signal inputs to the first multiplexer and the second multiplexer. The controller may be configured to select which scrambler to use based on one of the following: time, number of addresses or bit processed, a combination of both.

The hash module may also be enabled with one or more scramblers and one or more hash modules. The scrambler(s) is configured to receive memory address data and perform a scrambler operation on the at least some or all of the memory address data to generate scrambled data. The one or more hash modules are configured to perform a hash function on the scrambled data, received from the one or more scramblers, to generate a hash value that functions as an index to a hash index table.

In one embodiment, the module has two or more scramblers and further comprises one or more data selectors configured to selectively route received memory address data to one of the two or more scramblers for a first period and then route received memory address data to another of the two or more scramblers for a second period. The hash module may further include a controller configured to generate the control signal inputs to the data selector. In one embodiment, the controller is configured to select which scrambler to use based on one or more of the following: time, number of addresses or bit processed, a combination of both. It is contemplated that the hash module may be configured to perform a modulo hash function. Any type scrambler may be used, but in one configuration the scramblers are selected from the group consisting of: bit swapping functions, LFSR (Linear Feedback Shift Register) and function, CASR (Cellular Automata Shift Register) function. The output of the hash module may be used as an index to a hash table.

Also disclosed is a method for generating a hash value based on a received address with a reduced likelihood of a collision with another hash value. In one embodiment, the method includes scrambling the received address to create scrambled data and then providing the scrambled data to a first hash module. The first hash module performs a hash function with the first hash module on the scrambled data to create a first hash module hash value. This method of operation then compares the hash value to previously generated hash values. Responsive to the hash value being the same as a previously generated hash values, providing the scrambled data to a second hash module. Thereafter, the second hash module performs a hash function on the scrambled data to create a second hash module hash value which is different than the first hash module hash value.

In one embodiment, this method further comprises, providing the received address to one or more data selectors configured to selectively route the received address to one of the two or more scramblers based on a control signal. It is also contemplated that the hash module may further comprise generating the control signal provided to the data selector with a controller. In addition, this method may further comprise selecting which scrambler to use based on one or more of the following: time, number of addresses or bits processed, a combination of both.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks of the prior art, disclosed is an improved multi-level modulo hash function that provides better performance with sequential address inputs, without compromising the extremely low collision rate for single inputs. Disclosed herein is a method and apparatus which avoids sequential inputs to a hash function occupying or being mapped to contiguous space in a hash table. The disclosed system and apparatus modify the linear mapping characteristics of modulo hash function, which in turn changes the contiguous and periodic input address pattern. In one embodiment, a randomness function is applied to the input data. Disclosed is a two-step process, but in some embodiments, only a first step is optionally implemented.

As part of the two-step approach, the first step is to apply a scrambling function before performing the modulo function. Any type scrambling function may be used that provides a one to one input to output mapping. Possible scrambling functions include but are not limited to bit swapping functions, LFSR (Linear Feedback Shift Register) function, CASR (Cellular Automata Shift Register) function or any other scrambling function. In one embodiment, the scrambling function operates on the bits that form a memory address. By using a scrambling function, the group of input addresses will be scattered out and randomized. This randomizing results in the sequential input no longer being placed or mapped to a contiguous locations or slot in the hash table because scrambling the bits of the physical addresses breaks the linear nature of the modulo hash function.

To further reduce the likelihood of a collision, it is further proposed to implement two or more scramble functions and then alternate between use of the two or more scrambling functions. A single scrambling function, over time, could scatter different input groups into the same slots in a hash table, thus, encountering collisions. It is proposed to optionally implement a different scrambling function for every fixed distance, number of bits, number of physical addresses, after a time period, or based on some other factor so contiguous input address will no longer appear in a periodic pattern. This will avoid the scenario that different group of addresses will be assigned (randomized and hashed) into the same slot in the memory table (causing a collision) by the same scrambling function. This could otherwise occur because a scrambling function will repeat after a set number of inputs.

Figure 2:
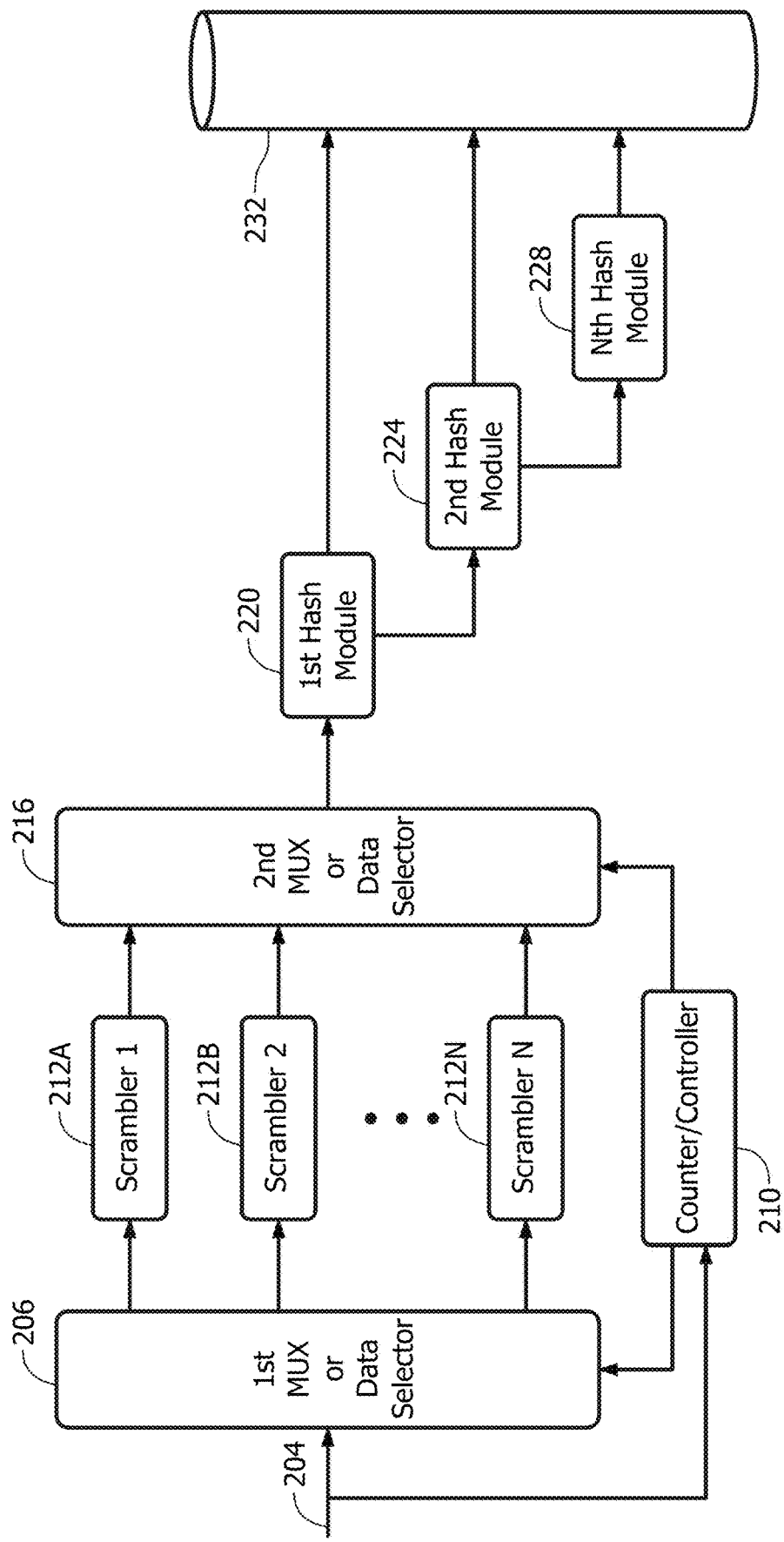
FIG. 2 illustrates a block diagram of an example embodiment of a hash function system according to one embodiment of the innovation.

FIG. 2 illustrates a block diagram of an example embodiment of a hash function system according to one embodiment of the innovation. This is but one possible embodiment of an address scrambler with scrambler rotations and it is contemplated that other embodiments may be enabled. The present embodiment is enabled in hardware, but it is contemplated the current or future embodiments may be enabled in software or a combination of both. Hardware based embodiments provide a greater level of processing speed for the modulo function thereby enabling high bandwidth and throughput. It is further disclosed that although shown and described in the context of a memory address hash system, it is contemplated that this system and method may be used in any environment or for any type of data that may have the characteristics that would lead to unwanted collisions.

As shown, an input 204 is provided and presents incoming addresses to a first multiplexer 206 and a counter and controller module 210. The first multiplexer 206 operates as is understood in the art and as such is not described in detail. The counter and controller module 210 monitor the incoming data such as on an address basis or a bit basis to count when a certain number of one or more of each has been received. The counter and controller module 210 may also function based on time or on some other metric other than address counts or bits.

The outputs of the first multiplexer 206 feeds into two or more scramblers. In this embodiment the scramblers are a first scrambler 212A, a second scrambler 212B, up to an Nth scrambler 212N where N is any whole number. The scramblers 212A, 212B, 212N execute a scrambling function on the input. As part of the operation of the first multiplexer 206, the input to the first multiplexer is provided to only one of the scramblers 212A, 212B, 212N such that a control signal from the counter and controller module 210 determines which scrambler receives the addresses input to the first multiplexer.

The output of the selected scrambler 212A, 212B, 212N is provided to a second multiplexer 216 which selects which scrambler output is passed to the second multiplexer's output as shown. In one embodiment, the counter and controller module 210 sends a control signal to the first multiplexer 206 and second multiplexer 216 to selectively control which scrambler receives the input addresses from input 204. The scrambler receiving the input addresses may be referred to as the active scrambler. The control signal from the counter and controller module 210 also controls the second multiplexer 216 to route the output from the active scrambler to the output of the second multiplexer 216. The multiplexers 206, 216 may be any type switch, de-multiplexer, control logic, data selector, or any other element configured to function as described herein.

The output of the second multiplexer 216 is provided to a first hash module 220. The first hash module 220 has an output that connects to a hash table 232 and an output that, in the event of a collision in the first hash table, outputs the second multiplexer 216 output to a second hash module 224. The second hash module 224 has an output that connects to the hash table 232 and an output that, in the event of a collision in the hash table by the second hash module 224, provides the second multiplexer 216 output to an Nth hash module 228.

Thus, the first hash module 224 performs a hash function on the output of the second multiplexer 216. If the resulting output of the hash function points to a slot in the hash table 232 that is not already occupied, then the address is placed in the hash table at that location. Conversely, if the resulting output of the hash function points to a slot in the hash table 232 that is already occupied, then a collision has occurred and the address to be hashed is routed to the second hash table 224. This process repeats through N number of hash modules.

Figure 1:
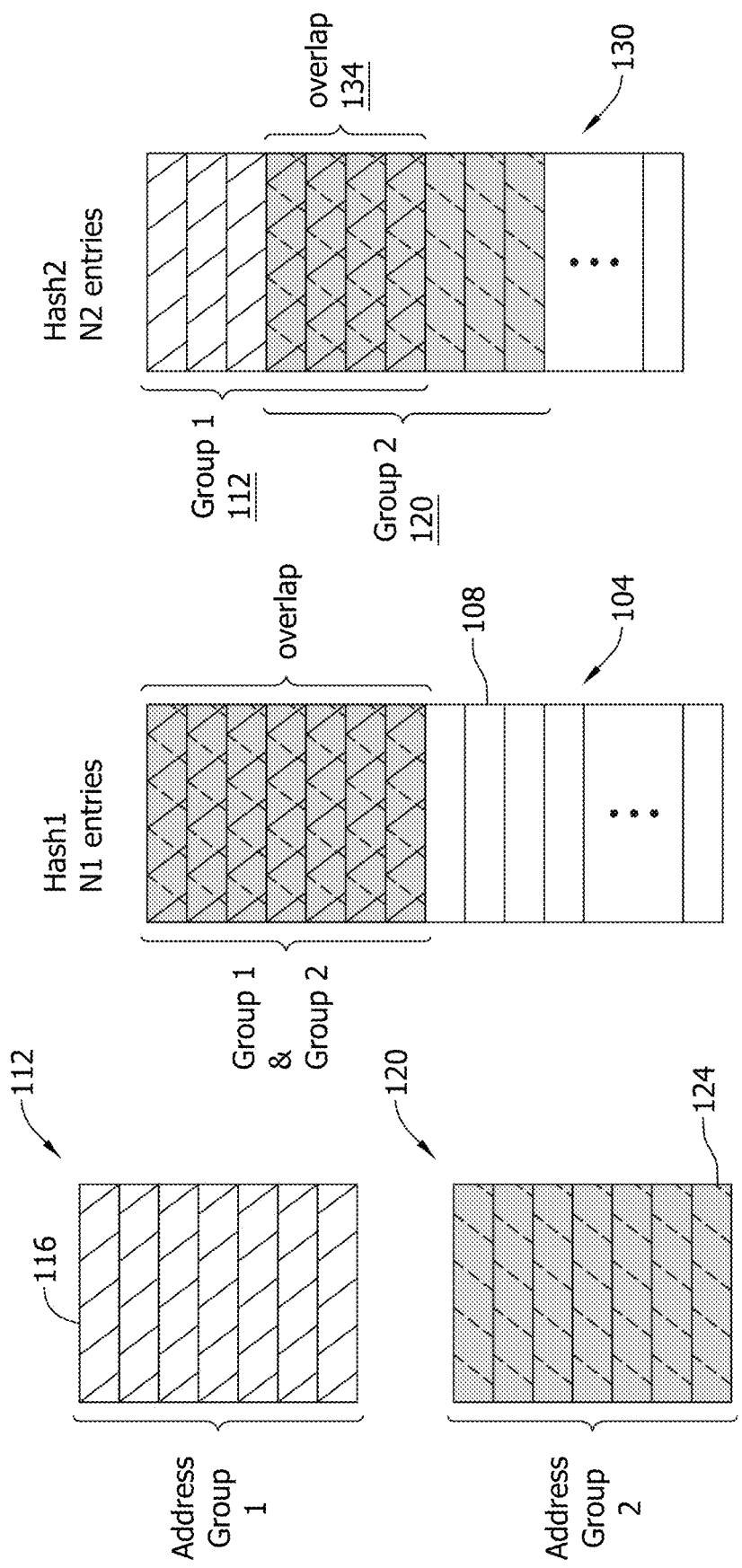
FIG. 1 is a diagram of an exemplary prior art memory address tables (hash tables) with associated address mapping.
Figure 3:
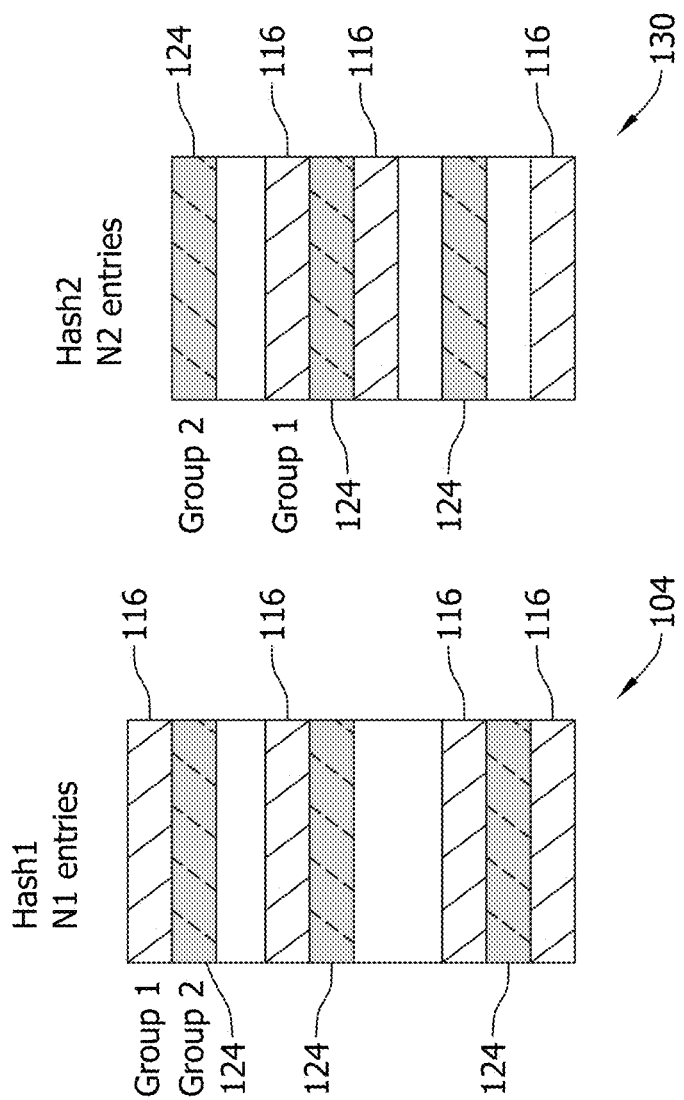
FIG. 3 is a diagram of an exemplary memory address tables (hash tables) with associated address mapping according to method of the disclosed invention.

FIG. 3 illustrates exemplary hash tables populated based on the embodiment of FIG. 2. Reference numbers from FIG. 1 are used in FIG. 3. In this example embodiment, the group 1 addresses 116 and group two addresses 124 are received but are scrambled prior to being hashed. This results in the first hash table 104 having the group 1 hash results 116 no longer being contiguous in the hash table due to the non-linearity in the scrambler output. As can be seen, in the event of sequential physical addresses, the hash function results spread out the hash results. Similarly, in the rare event of collision during the first hash operation and table mapping, the hash output will be routed to the second hash function, and the second hash table 130 is populated as shown. Again, there are no contiguous entries for the group 1 hash results 116 and the group 2 hash results 124 in the second hash table 130.

Figure 4:
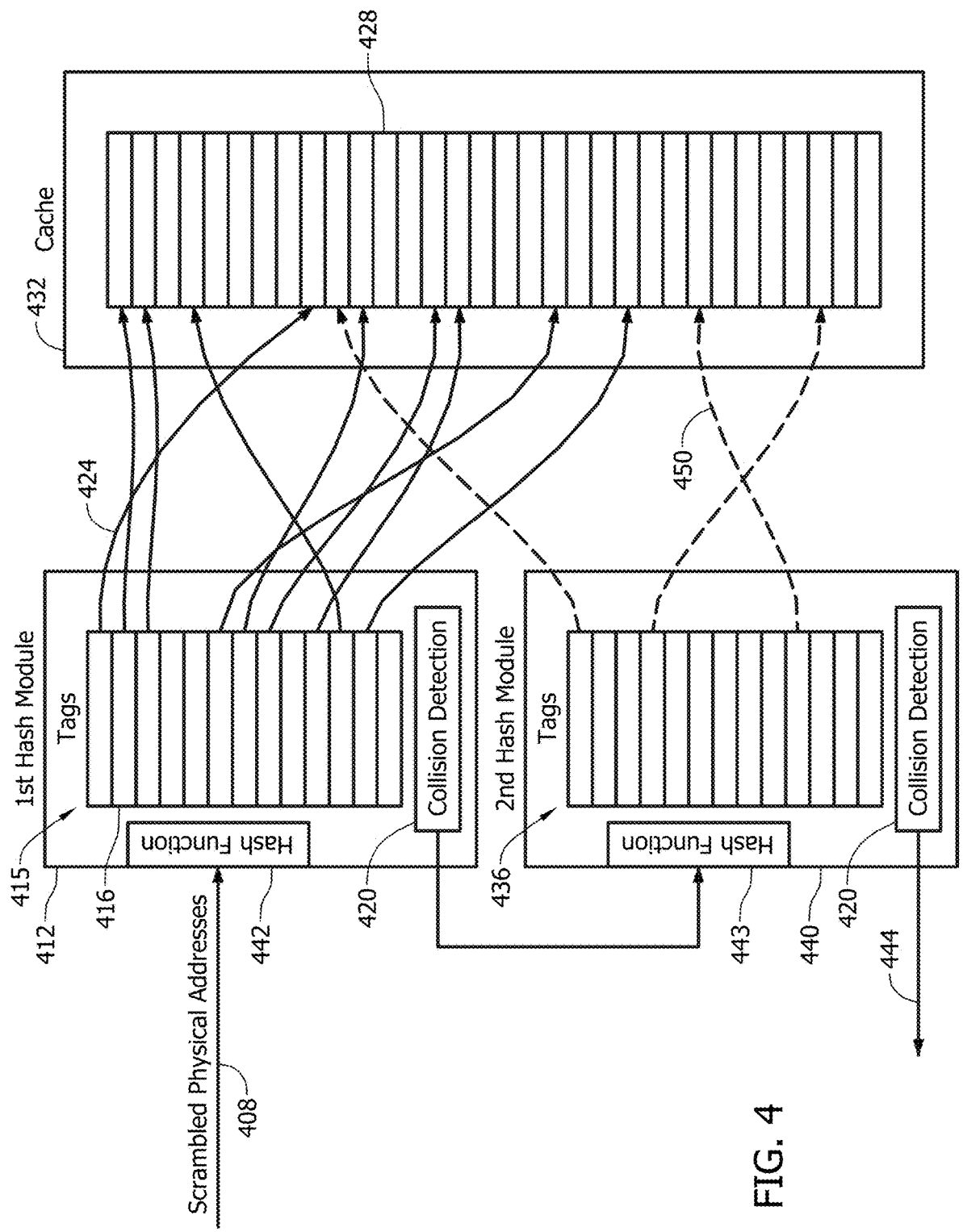
FIG. 4 illustrates a block diagram showing the hash modules mapping data to memory locations.

FIG. 4 illustrates a block diagram showing the hash modules mapping data to memory locations. This is but one possible configuration and environment of use for the hashing functions described herein. An input 408 carries a scrambled physical address to the first hash module 412. The first hash module 412 performs a hash function on the scrambled physical address to generate hash values. The hash values are used to index the hash table. The assigning of cache addresses may vary from system to system based on system design. A mapping 415 of occupied memory locations are identified within the first hash module such that an occupied tag location represents whether the hash table location is occupied. As long as a particular hash table location is available, the system can occupy it and use other methods to assign a cache address to this physical address.

For example, a scrambled physical address is hashed according to a first hash function 442, and the hash result is stored in the hash table 415 at a location 416. The hash table 415 is updated to designate that cache location 428 in the cache is occupied, which allows the first hash module to know that cache location 428 is occupied. Solid line mappings 424 illustrate hash function location assignments from the first hash module 412 to the cache 432.

This process repeats with mapping of the hash function output to location in cache 432 and recording the mapping in the hash table 415. Although shown as a cache memory 432, it is contemplated that any type or function of memory may be used. As discussed above, the improved hash functions may be adopted for any application.

Also included in the first hash module 412 is a collision detection module 420 configured to detect a collision between a prior hash function output and a newly generated hash function output. For example, if the hash table location 416 is already occupied when a hash module 412 maps a new incoming physical address to the same location, then the collision detection module 420 detects or is alerted to the collision and routes the physical address to a second hash module 440. Because of the scrambling, collisions at the first hash module 412 are rare, even with blocks of sequential physical addresses. At the second hash module 440, the scrambled physical address is subject to the second hash function 443 and the resulting hash output is used to map the physical address to a location in the cache 432. The second hash function (unit) 443 may perform a different type hash function than the first hash function (unit) 442. A tag is mapped in the hash table 436 to designate that that particular location in the cache is occupied. Dash line mappings 450 illustrate hash function location assignments from the second hash module 440 to the cache 432.

In the event the second hash module 440 generates a hash output that points to an occupied location, then the collision detection module 420 will detect the collision and generate a collision output notification on path 444.

Figure 5A:
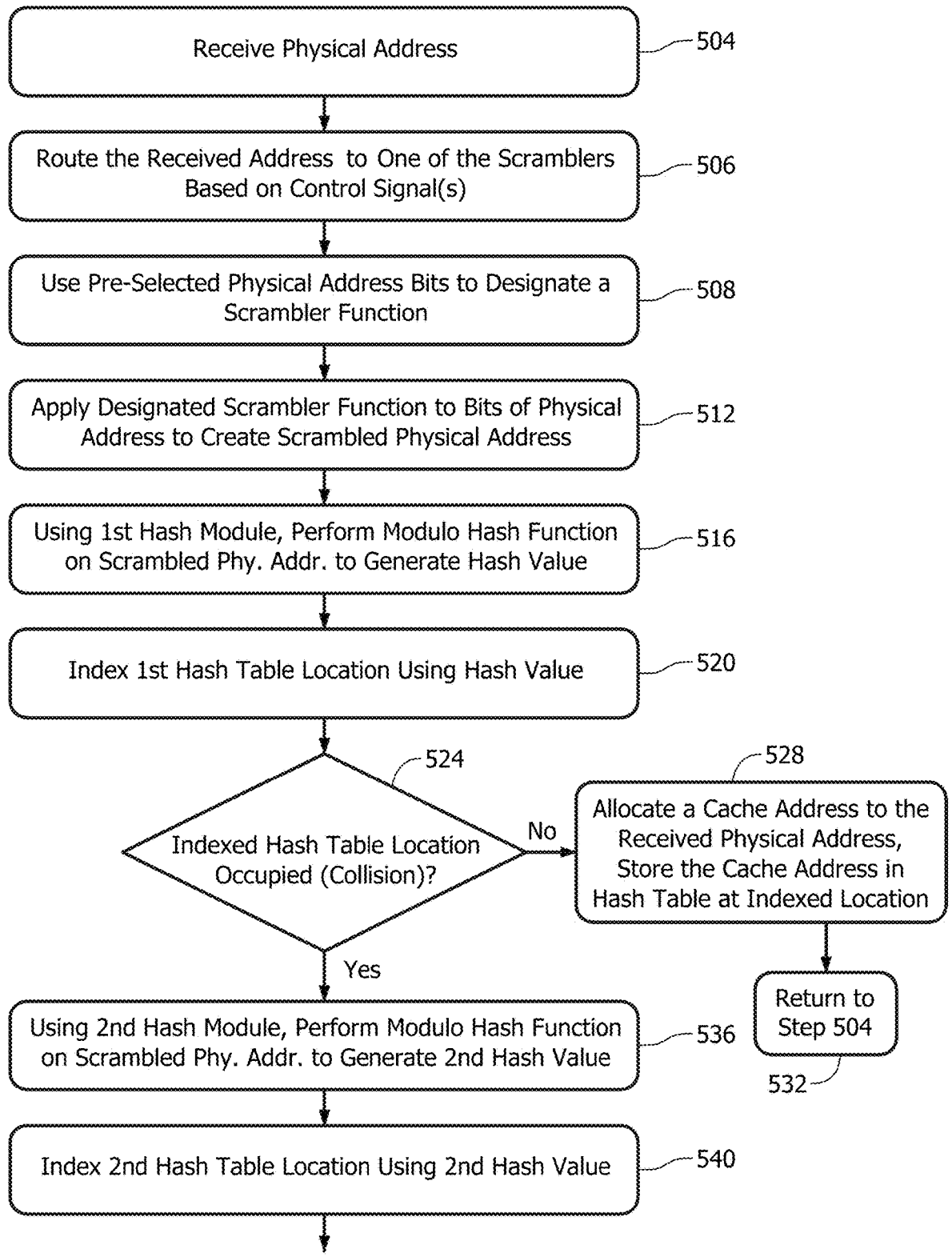
FIG. 5A and FIG. 5B illustrate an operational flow diagram of an example method of operation.
Figure 5B:
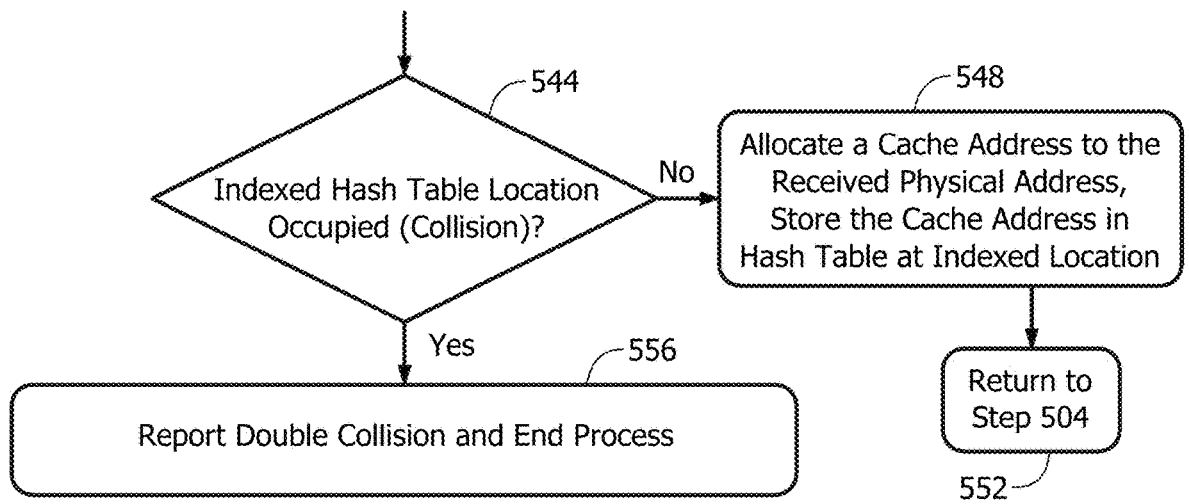

FIGS. 5A and 5B illustrates an operational flow diagram of an example method of operation. This is but one possible method of operation and as such, other operational schemes are possible and contemplated. At a step 504, the hash system receives a physical address for processing. At step 506, the received address is routed to one of the scramblers based on a control signal provide to the multiplexer (data selector). Next, at a step 508, the hash system uses preselected physical address bits to designate a scrambler function and selects which scrambler function to utilize. In other embodiments, other methods may be used to determine which scrambler function to utilize. For example, a bit counter or address counter may be used to change the scrambling function after a predetermined number of bits, or a predetermined number of addresses have been received or processed.

At a step 512, the system applies the designated scrambler function to the bits of the received physical address to create a scramble physical address. Thereafter, at a step 516, the first hash module performs a modulo hash function on the scrambled physical address to generate a hash value. In this embodiment a modulo function is used but in other embodiments other hash operation(s) may be used. Next, at a step 520, the system indexes the first hash table location using the generated hash value. The indexing is a look-up or look-into the first hash table.

At a decision step 524, a determination is made whether the indexed hash table location is occupied. If it is not occupied, then the operation advances to step 528 and the system allocates a cache address to the received physical address and stores the cache address in the hash table at the indexed location. This associates the cache address and its location in the cache with the indexed location or slot in the hash table. The physical address is stored in the hash table together with the cache address. Stored in the cache memory is the transaction data (or context) belonging to this physical address. The operation then returns to step 504 for continued processing of additional physical addresses.

Alternatively, if at step 524 the indexed hash table location is occupied, indicating a collision has occurred, then the operation advances to step 536. At step 536 the scrambled physical address is provided to the second hash module which performs the modulo function on the scrambled physical address to generate a second hash value. The second hash function will yield a different result than the first hash function. Thereafter, at a step 540, the generated second hash value is used to index the second hash value into a second hash table location. In this embodiment, each hash module has its own hash table.

Turning to FIG. 5B, at a decision step 544, a determination is made whether the indexed hash table location, based on the second hash value, is occupied, indicating that a collision has occurred. If a collision has not occurred, the operation advances to step 548 during which the system allocates a cache address to the received physical address and the cache address is stored in the hash table at the indexed location. Thereafter, the operation advances to step 552 and the path returns to step 504.

Alternatively, if at step 544 the indexed hash table location is occupied, indicating a collision has been encountered, then the operation advances to a step 556 and a double collision is reported and the process ends. Although shown with two possible hash routines before a collision is reported, it is contemplated that greater than two hash modules may be implemented.

To retrieve or read data that is stored in memory, the system inputs the physical address corresponding to the data into the hash function to generate the hash table location and compare the physical address stored at the hash table location with the input address. If the located stored physical address matches the input address, then the system uses the cache address stored in this hash table location to retrieve or read the data stored in the memory. In other embodiments, other methods may be utilized to retrieve or read data from memory.

As a result of this innovation, the possibility of having two groups of sequential input addresses collide will be significantly lower. To maintain data integrity, it is preferred or required that every utilized scramble function have a one-to-one mapping, so the scramble procedure itself will not introduce collisions. In one embodiment, such as for CASR, among multiple different implementations, only implementations that guarantee one-to-one mapping are allowed. In addition, it is understood that by utilizing a greater number of different scrambler functions, it is less likely a collision will happen.

Figure 6:
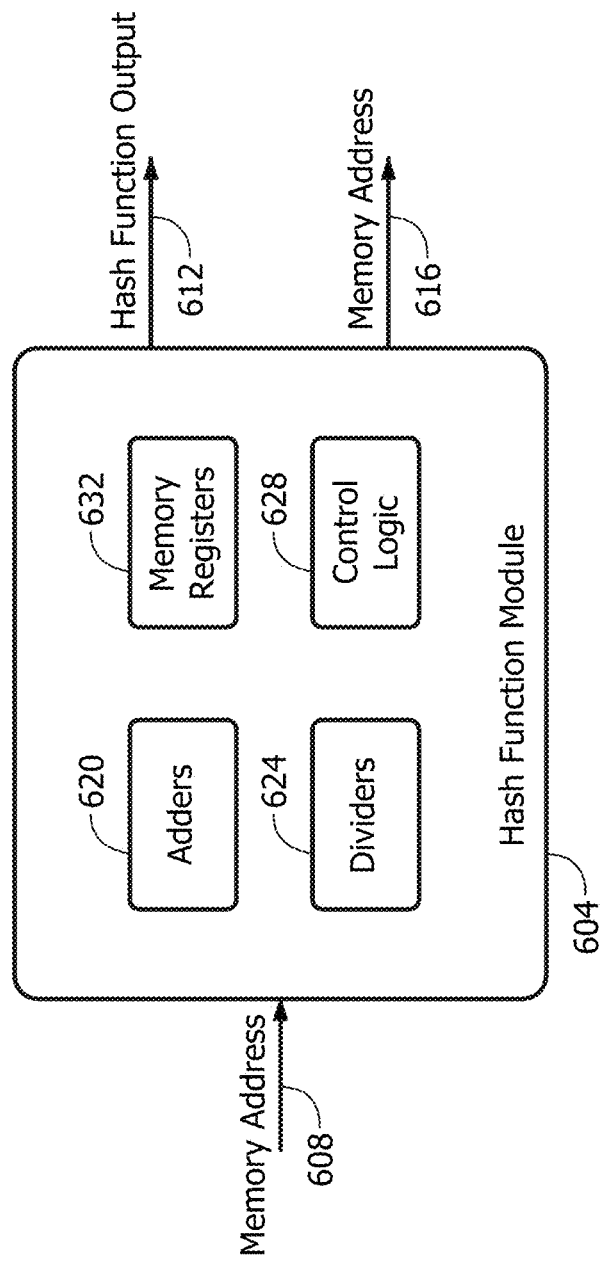
FIG. 6 illustrates an example embodiment of a hash function module.

FIG. 6 illustrates an example embodiment of a hash function module. This is but one possible embodiment of a hardware-based hash function module. Any type hash function may be enabled with this embodiment, and in other embodiments, different elements may be provided. It is also contemplated that the hash function may be enabled in software or a combination of hardware. As shown, the hash function module 604 includes an input 608 configured to receive a memory address, such as a physical memory address. The hash function module 604 processes the memory address input to generate a hash function output on a hash output 612 and may optionally output the memory address on a memory address output 616.

Internal to the hash function module 604 are several processing elements including adders 620, dividers 624, memory registers 632, and control logic 628 dispersed within the module. This is but one possible arrangement of elements and one of ordinary skill in the art will arrive at different embodiments for a hash function module. One exemplary hash function is the modulo function. In computing, the modulo operation returns the remainder or signed remainder of a division, after one number is divided by another (called the modulus of the operation). For example, the expression "5 mod 2" would evaluate to 1, because 5 divided by 2 has a quotient of 2 and a remainder of 1, while "9 mod 3" would evaluate to 0, because the division of 9 by 3 has a quotient of 3 and a remainder of 0; there is nothing to subtract from 9 after multiplying 3 times 3. The modulo is but one possible hash function that is contemplated for use.

Figure 7:
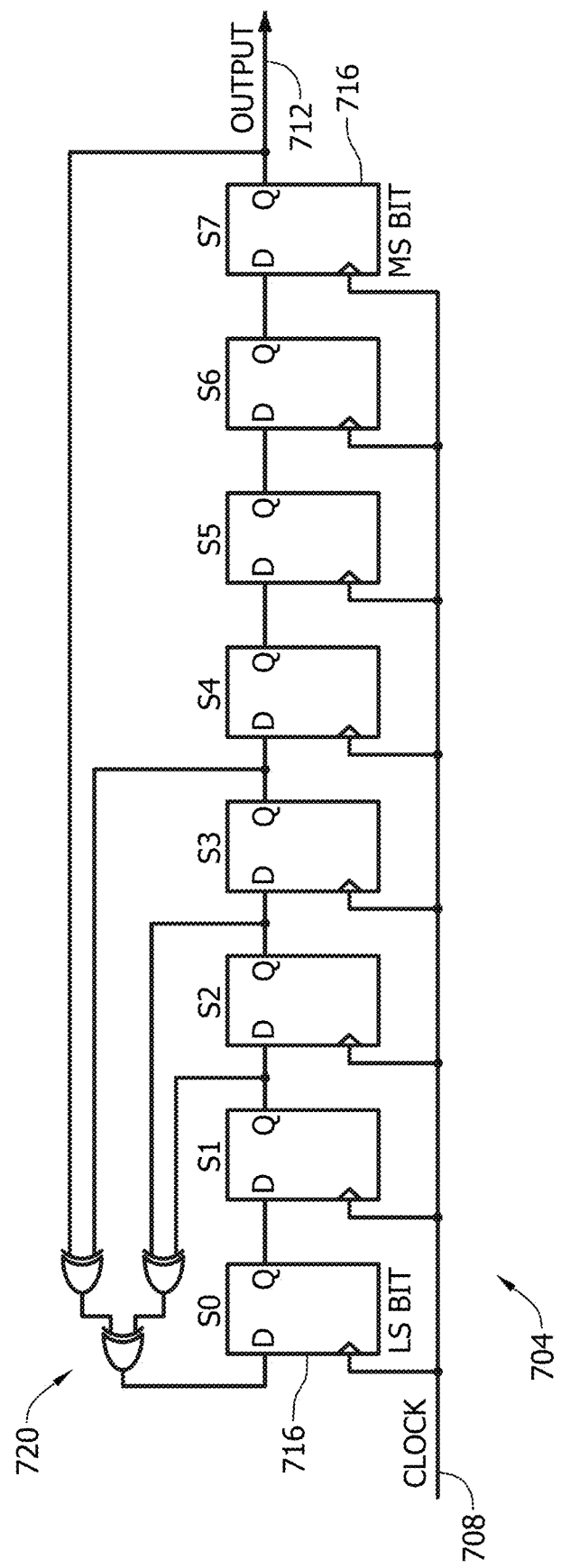
FIG. 7 illustrates an example embodiment of a data scrambler.

FIG. 7 illustrates an example embodiment of a data scrambler. This is but one possible configuration and other arrangements are considered and may be arrived at by one of ordinary skill in the art. This example configuration is for a linear feedback shift register, but other scrambling functions may be used including, but not limited to, bit swapping functions, CASR (Cellular Automata Shift Register) function or any other scrambling function. This embodiment of the scrambler 704 includes a clock input 708 and an output 712 that provides the scrambled input bits as an output. The clock signal input connects to two or more shift registers 716, which in this embodiment includes eight shift registers S0-S7. In other embodiments a greater or fewer number of shift registers may be used.

The shift registers 716 are arranged from least significant bit S0 to most significant bit S7. Each shift register is connected to the adjacent shift register. During operation, the shift registers are seeded with the data to be scrambled, in this innovation the memory address, prior at start-up. Several tap connections to the shift register are made between logic elements 720. In this embodiment, the taps connect between the logic elements and to the output of shift register 51, S2 and S3, although this will vary in different embodiments. The output of the logic elements feed back into the shift register S0 716. In other embodiments, other arrangements of logic elements may be used.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A hash system comprising;
    a first multiplexer having at least one data input, a control signal input, and two or more outputs such that the first multiplexer is configured to, responsive to a control signal, output received data on one of the two or more outputs as selected data;
    two or more scramblers configured to receive the selected data output from the first multiplexer and perform a scrambler operation on the selected data to generate scrambled data;
    a second multiplexer having two or more inputs, a control signal input, and at least one output such that the second multiplexer is configured to, responsive to a control signal, output scrambled data from the two or more scramblers on the at least one output;
    a controller configured to generate the control signal inputs to the first multiplexer and the second multiplexer, and the controller is configured to select which of the two or more scramblers to use based on one or more of the following: time, number of addresses or bit processed, or a combination of both;
    a first hash unit having a first hash unit input, that connects to the second multiplexer to receive the scrambled data, and a first hash unit output that carries a hash value that results from a hash function, performed by the first hash unit, on the scrambled data which was received from received from the second multiplexer; and
    a second hash unit having a second hash unit input that connects to the first hash unit and receives the scrambled data, responsive to a collision occurring in the first hash unit, the second hash unit also having a second hash unit output that carries a hash value that results from a hash function, performed by the second hash unit, on the scrambled data received from the first hash unit.

2. The hash system of claim 1 wherein the hash system is configured to perform a modulo hash function.

3. The hash system of claim 1 wherein the scramblers are selected from the group consisting of: bit swapping functions, LFSR (Linear Feedback Shift Register) function, and CASR (Cellular Automata Shift Register) function.

4. The hash system of claim 1 wherein a hash value which is output from the hash system is an index to a hash table.

5. The system of claim 1 wherein the first hash unit and the second hash unit both comprise adders, dividers, memory registers, and control logic.

6. A hash system comprising:
    two or more scramblers configured to receive memory address data and perform a scrambler operation on some or all of the memory address data to generate scrambled data;
    one or more data selectors configured to selectively route, based on control signal inputs, received memory address data to at least one of the two or more scramblers for a first period and then route received memory address data to another of the two or more scramblers for a second period;
    a controller configured to generate the control signal inputs provided to the one or more data selectors wherein the controller is configured to select which of the two or more scramblers to use based on one or more of the following: time, number of addresses or bit processed, or a combination of both; and
    one or more hash units, each having a hash unit input and a hash unit output, such that the hash unit input is connected to at least one of the one or more data selectors to receive and perform a hash function on the scrambled data, received from the one or more scramblers, to generate a hash value which is provided on the hash unit output, wherein the hash value functions as an index to a hash index table.

7. The hash system of claim 6 wherein the one or more hash units are configured to perform a modulo hash function.

8. The hash system of claim 6 wherein the scramblers are selected from the group consisting of: bit swapping functions, LFSR (Linear Feedback Shift Register) function, and CASR (Cellular Automata Shift Register) function.

9. The hash system of claim 6 wherein the hash value output from the the one or more hash units is an index location to a fixed size hash table and a cache address is stored at the index location in the fixed size has table.

10. A method for generating a first hash module hash value based on a received address with a reduced likelihood of a collision with previously generated hash value comprising:
    generating one or more control signals with a controller and providing the one or more control signals to one or more data selectors;
    providing a received address to at least one of the one or more data selectors, the one or more data selectors configured to selectively route the received address to a selected scrambler from a group of two more scramblers based on the one or more control signals;

determining a selected scrambler, from the two or more scramblers, to use based on one or more of the following: time, number of addresses or bits processed, or a combination of both;

routing the received address to the selected scrambler;

scrambling the received address with the selected scrambler to create scrambled data;

providing the scrambled data to a first hash module;

performing a hash function with the first hash module on the scrambled data to create a first hash module hash value;

comparing the first hash module hash value to previously generated hash values;

responsive to the first hash module hash value being the same as a previously generated hash value, providing the scrambled data to a second hash module; and performing a hash function with the second hash module on the scrambled data to create a second hash module hash value which is different than the first hash module hash value.

11. The method of claim 10 wherein at least one of the first hash module or the second hash module performs a modulo hash function.

12. The method of claim 10 wherein the two or more scramblers are selected from the group consisting of: bit swapping functions, LFSR (Linear Feedback Shift Register) function, and CASR (Cellular Automata Shift Register) function.

13. The method of claim 10 wherein the first hash module hash value is an index to a hash table.

\* \* \* \* \*